(12) United States Patent
Shah et al.

(10) Patent No.: US 11,076,440 B2
(45) Date of Patent: Jul. 27, 2021

(54) METHODS AND APPARATUS FOR REDUCING COLLISIONS BETWEEN CDRX AND PAGING OPERATIONS

(71) Applicants: QUALCOMM Incorporated, San Diego, CA (US); Chintan Shirish Shah, Chula Vista, CA (US); Jiming Guo, Beijing (CN)

(72) Inventors: Chintan Shirish Shah, Chula Vista, CA (US); Jiming Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 15/312,747

(22) PCT Filed: May 28, 2014

(86) PCT No.: PCT/CN2014/078621
§ 371 (c)(1),
(2) Date: Nov. 21, 2016

(87) PCT Pub. No.: WO2015/180059
PCT Pub. Date: Dec. 3, 2015

(65) Prior Publication Data
US 2017/0196042 A1    Jul. 6, 2017

(51) Int. Cl.
*H04W 76/19* (2018.01)
*H04W 76/28* (2018.01)
*H04W 68/00* (2009.01)

(52) U.S. Cl.
CPC ......... *H04W 76/19* (2018.02); *H04W 68/005* (2013.01); *H04W 76/28* (2018.02); *H04W 68/00* (2013.01)

(58) Field of Classification Search
CPC .. H04W 76/19; H04W 76/028; H04W 68/005
See application file for complete search history.

(56) References Cited

U.S. PATENT DOCUMENTS

| | | |
|---|---|---|
| 8,634,383 B2 | 1/2014 | Chin et al. |
| 8,996,041 B2 | 3/2015 | Chin et al. |
| 2010/0202430 A1* | 8/2010 | Chin ............. H04W 68/12 370/342 |
| 2013/0040666 A1* | 2/2013 | Chin ............. H04W 68/00 455/458 |
| 2013/0070656 A1* | 3/2013 | Chin ............. H04W 68/02 370/311 |
| 2013/0229965 A1 | 9/2013 | Bressanelli et al. |
| 2013/0265987 A1 | 10/2013 | Ramachandran et al. |
| 2013/0301501 A1 | 11/2013 | Olvera-Hernandez et al. |

(Continued)

FOREIGN PATENT DOCUMENTS

| | | |
|---|---|---|
| CN | 102160439 A | 8/2011 |
| WO | 2011056250 | 5/2011 |

(Continued)

OTHER PUBLICATIONS

International Search Report and Written Opinion for PCT/CN2014/078621, dated Mar. 2, 2015.

*Primary Examiner* — Harry H Kim
(74) *Attorney, Agent, or Firm* — Patterson + Sheridan, LLP (57) ABSTRACT

Certain aspects of the present disclosure relate to techniques and apparatus for reducing collisions between CDRX and paging operations.

18 Claims, 8 Drawing Sheets

(56) References Cited

U.S. PATENT DOCUMENTS

| | | | |
|---|---|---|---|
| 2014/0064103 A1* | 3/2014 | Dimou | H04W 76/18 370/242 |
| 2014/0099955 A1 | 4/2014 | Nukala et al. | |
| 2014/0112221 A1 | 4/2014 | Verger et al. | |
| 2014/0112271 A1 | 4/2014 | Pan | |
| 2014/0119343 A1 | 5/2014 | Chin et al. | |
| 2015/0087313 A1* | 3/2015 | Kim | H04W 36/32 455/437 |

FOREIGN PATENT DOCUMENTS

| | | |
|---|---|---|
| WO | WO-2011059521 A1 | 5/2011 |
| WO | 2013147499 A1 | 10/2013 |

\* cited by examiner

METHODS AND APPARATUS FOR REDUCING COLLISIONS BETWEEN CDRX AND PAGING OPERATIONS

BACKGROUND

Field

The present disclosure relates generally to wireless communication, and more particularly, to methods and apparatus for reducing collisions between connected discontinuous reception (CDRX) and paging operations (e.g., for avoiding persistent long term evolution (LTE) connected discontinuous reception (CDRX) listening period collisions with CDMA2000 1× Radio Transmission Technology (1×RTT) paging cycles and Global System for Mobile (GSM) communications paging cycles/slots).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. "LTE" refers generally to LTE and LTE-Advanced (LTE-A). Preferably, these improvements should be applicable to other multi-access technologies and the telecommunication standards that employ these technologies.

SUMMARY

Certain aspects of the present disclosure provide a method for wireless communications by a user equipment (UE). The method generally includes entering a mode wherein the UE alternates between a listening period and a non-listening period while connected to a first radio access technology (RAT) network, wherein the listening period is determined based on an offset value assigned by the first RAT network, determining that a plurality of listening periods conflict with one or more paging intervals in a second RAT network, and taking action to obtain a new offset value in an attempt to avoid conflicts between one or more subsequent listening periods and the one or more paging intervals in the second RAT network.

Aspects generally include methods, apparatus, systems, computer program products, and processing systems, as substantially described herein with reference to and as illustrated by the accompanying drawings.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 1:
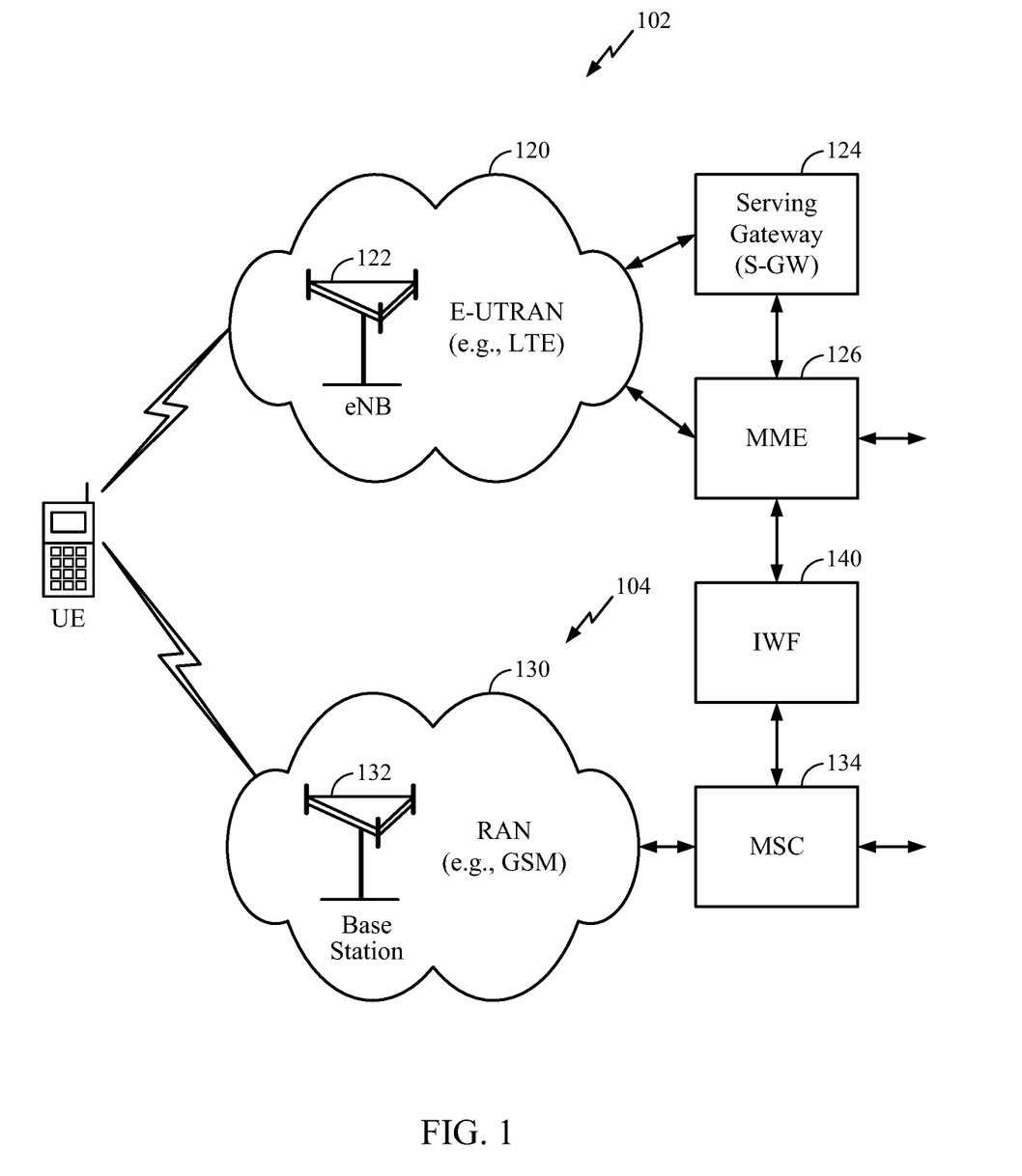
FIG. 1 illustrates an exemplary deployment in which multiple wireless networks have overlapping coverage, in accordance with certain aspects of the present disclosure.

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments (UEs). Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii)

another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
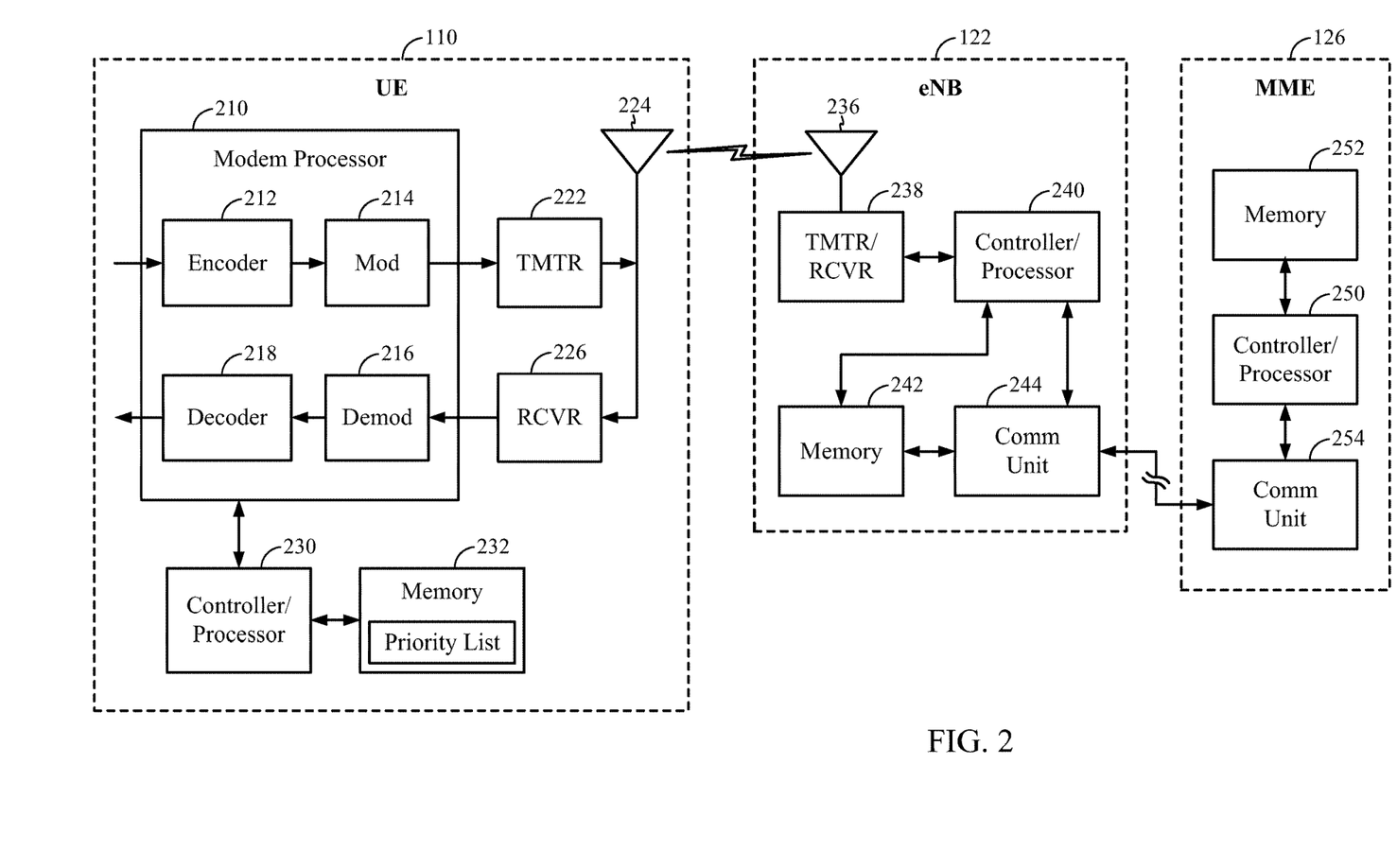
FIG. 2 illustrates a block diagram of a user equipment (UE) and other network entities, in accordance with certain aspects of the present disclosure.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1×RTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIG. 8. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126. Memory 252 may store program codes and data for MME 126. A communication unit 254 may support communication with other network entities.

According to aspects, as will be described in more details herein, the UE 110 may support communications with multiple RATs (e.g., concurrent RATs) (CRAT). The CRAT UE may share uplink transmissions between two RATs, for example, in terms of TDM. The CRAT UE may support dual receiving of downlink transmissions. According to aspects, as will be described in more details herein, the UE 110 may be a single radio device. Such UE may support communications with multiple RATs.

FIG. 2 shows simplified designs of UE 110, eNB 122, and MME 126. In general, each entity may include any number of transmitters, receivers, processors, controllers, memories, communication units, etc. Other network entities may also be implemented in similar manner.

For example, UE 110 of FIG. 2 comprises a single TMTR 222 and a single RCVR 226. According to aspects, UE 110 may comprise a single TMTR and a dual RCVR, and therefore may support CRAT. For example, UE 110 may share uplink transmissions between two RATs and may support dual downlink receiving. According to aspects, the UE may support CRAT with LTE and GMS or CDMA2000 1×RTT.

One challenge with utilizing a single transmitter for multiple RAT communications is that, at times, there may be conflicts between scheduled uplink transmissions in both RATs. While the conflict may occur with an uplink transmission, the uplink transmission itself may result from a scheduled downlink transmission. For example, for scheduled LTE downlink transmissions, a UE may need to transmit an ACK in uplink to confirm it received the data. In other words, it is possible that a UE may be scheduled for uplink transmission in both RATs during given a transmission period.

In some cases, Rx with multiple RATs (e.g., concurrent Rx) may also be achieved. For example, two Rx (e.g., two separate receive chains with two separate antennas) may be shared by GSM or CDMA2000 1×RTT, and LTE in a manner similar to Simultaneous Hybrid Dual Receivers (SHDR). When GSM or CDMA2000 1×RTT receiving is not needed, LTE may use two receive chains for multiple input multiple output (MIMO) and diversity. When GSM or CDMA2000 1×RTT receiving is needed, one Rx may be tuned to GSM or CDMA2000 1×RTT, and the remaining Rx may be used for LTE receiving. In some embodiments, since only one receive chain is being used for LTE, the UE may report a fake channel quality indictor (CQI) to avoid eNB scheduling for dual layer transmission.

Similarly, a challenge that exists with utilizing a single receiver for communications with multiple RATs is that, at times, there may be conflicts between scheduled downlink transmissions in both RATs. UE 110 shown in FIG. 2 comprises a single TMTR 222 and single RCVR 226, and therefore may only communicate with a single RAT at any given time, for example, LTE network 102 or GSM network 104 shown in FIG. 1.

In a single-radio device capable of communicating over multiple RATs (e.g., 1×RTT, GSM, and LTE), such as the UE 110, the device occasionally tunes its radio to each supported RAT and listens for communications (e.g., pages) from a BS of that RAT. In order to detect and receive a page or other communication, the device may tune its radio to a RAT for a period of time (e.g., 80 ms). The device may tune its radio to a particular RAT periodically, with the period (e.g., 1.28 sec, 2.56 sec, etc.) configurable by the network via RRC signaling, for example.

Figure 3:
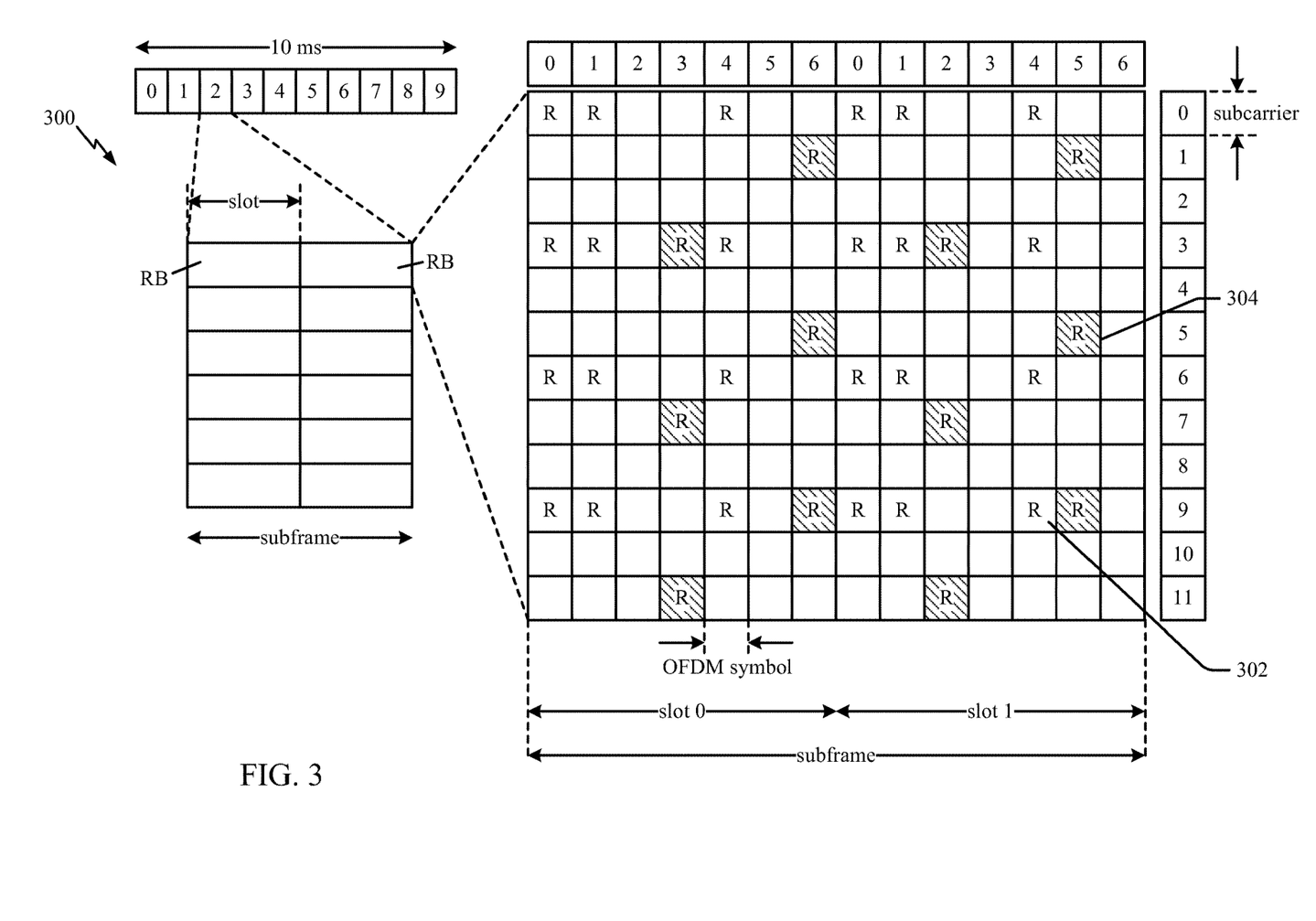
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
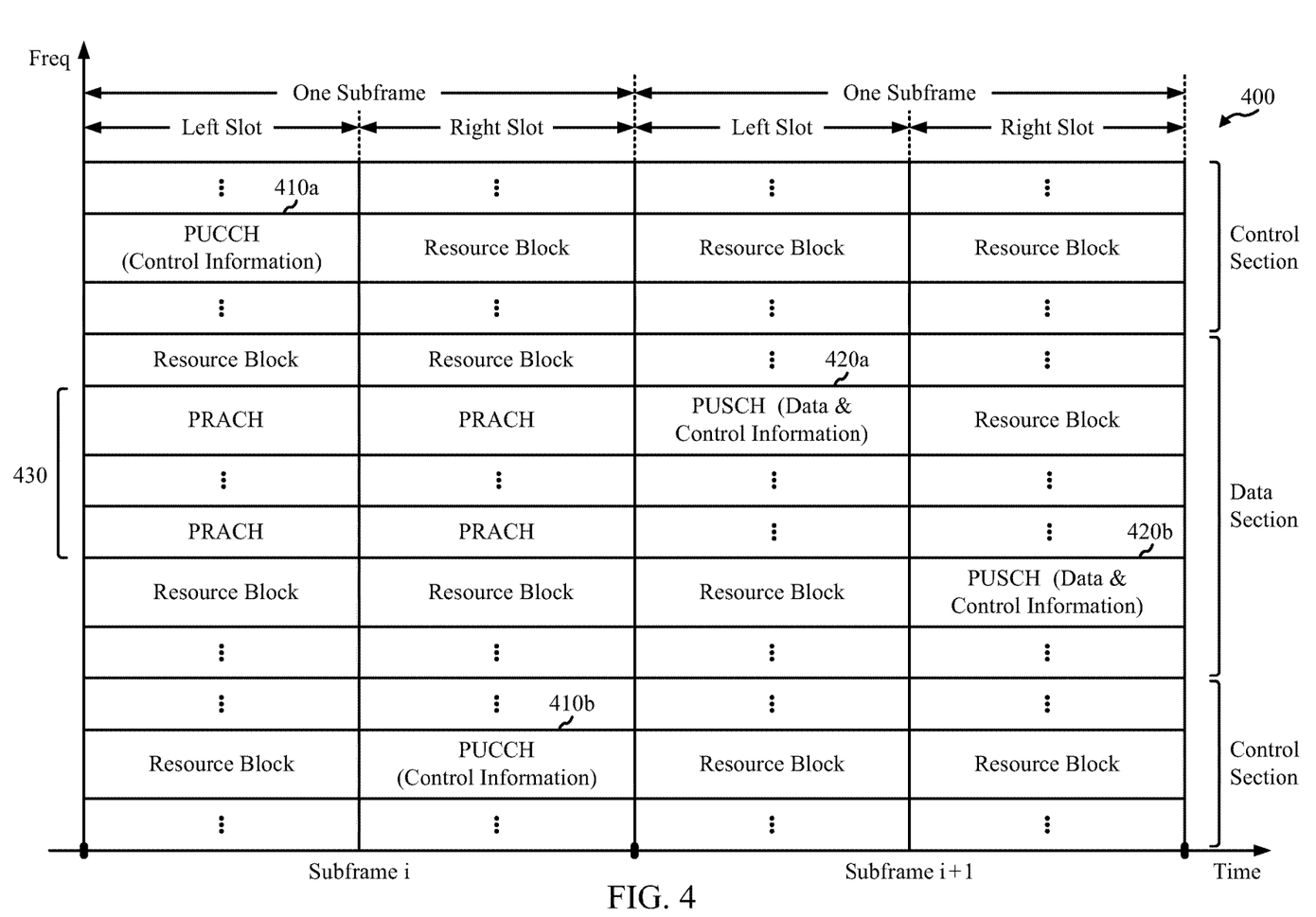
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
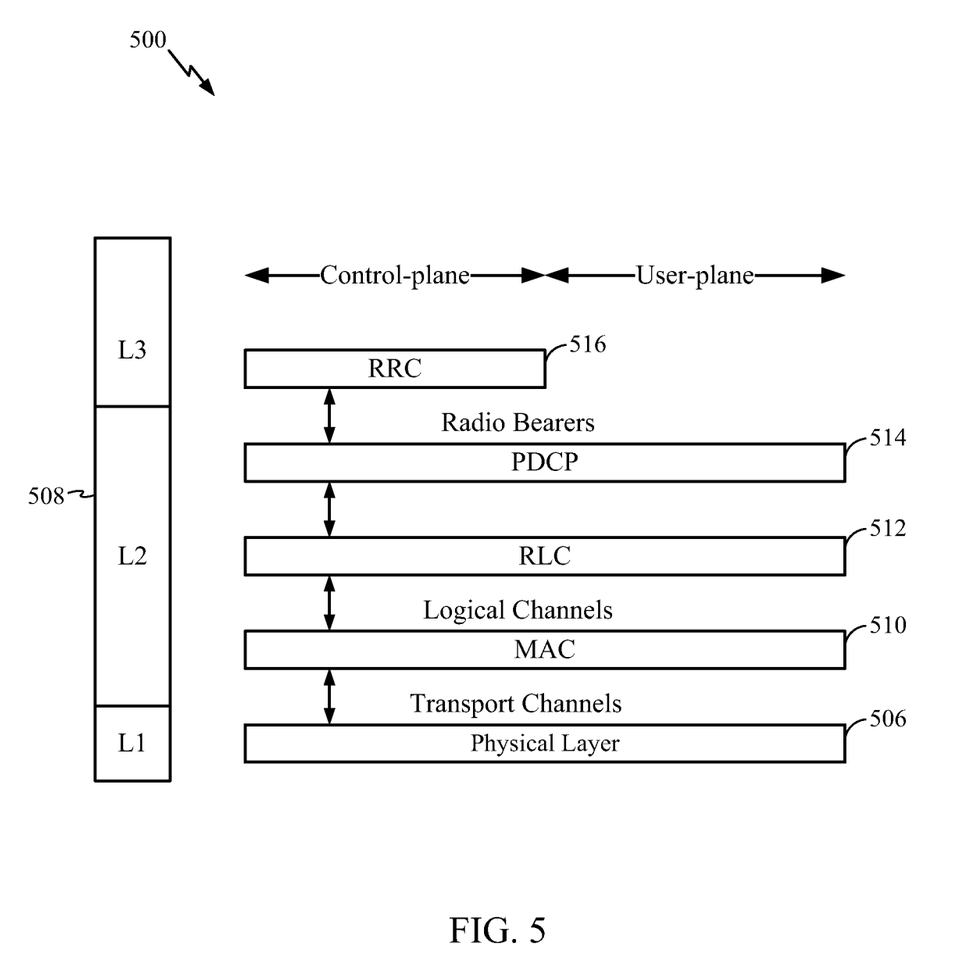
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
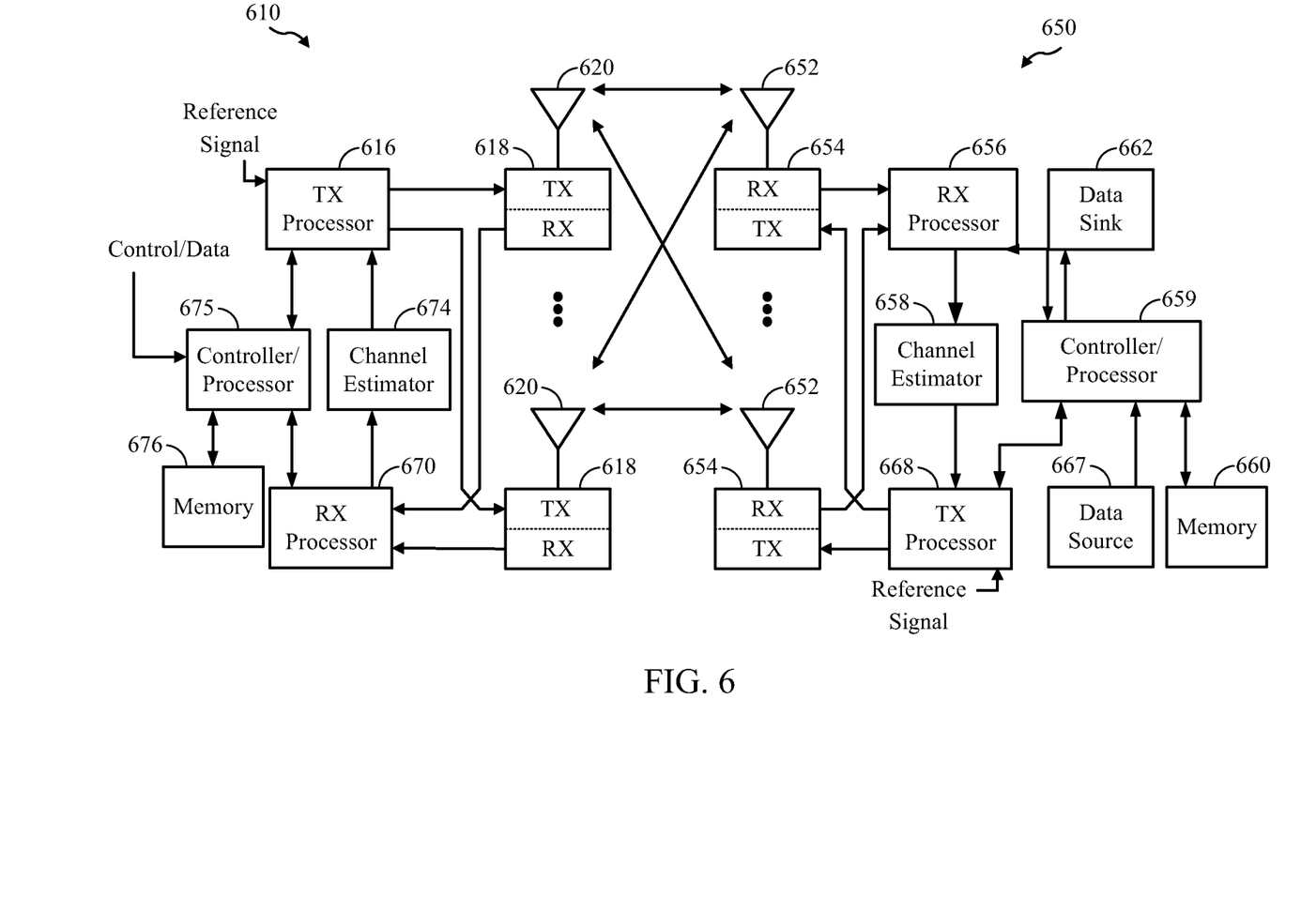
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations for example operations 800 in FIG. 8, and/or other processes for the techniques described herein, for example. The controller/processor 675 and/or other processors and modules at the eNB 610 may perform or direct operations and/or other processes for the techniques described herein, for example. In aspects, one or more of any of the components shown in FIG. 6 may be employed to perform example operations 800 and/or other processes for the techniques described herein.

Example CDRX Mode Operations

With the ever-increasing popularity of smart phones, there are many new challenges for the design of wireless systems, including power consumption and signaling demands. For example, instead of being awake only for the typically small percentage of talk time, smart phones are awake much more often. Applications, such as e-mail or social networking, may send "keep-alive" message every 20 to 30 minutes, for example. Such applications often use many small and bursty data transmissions that may entail a significantly larger amount of control signaling. Some system level evaluations have identified control channel limitations in addition to traffic channel limitations.

Connected Discontinuous Reception (CDRX) is a technique used in wireless communication to reduce power consumption, thereby conserving the battery of the mobile device. The mobile device and the network negotiate phases in which data transfer occurs, where the mobile device's receiver is turned on (e.g., in a connected state), referred to as an on duration of the CDRX cycle. During other times, referred to as off durations, the mobile device turns its receiver off and enters a low power state. There is usually a function designed into the protocol for this purpose. For example, the transmission may be structured in slots with headers containing address details so that devices may listen to these headers in each slot to decide whether the transmission is relevant to the devices or not. In this case, the receiver may only be active at the beginning of each slot to receive the header, conserving battery life. Other DRX techniques include polling, whereby the device is placed into standby for a given amount of time and then a beacon is sent by the base station periodically to indicate if there is any data waiting for it.

In LTE, CDRX is controlled by the RRC protocol. RRC signaling sets a cycle where the UE's receiver is operational for a certain period, typically when all the scheduling and paging information is transmitted. The serving evolved Node B (eNB) may know that the UE's receiver is completely turned off and is not able to receive anything. Except when in CDRX, the UE's receiver may most likely be active to monitor a Physical Downlink Control CHannel (PDCCH) to identify downlink data. During CDRX, the UE's receiver may be turned off. In LTE, CDRX also applies to the RRC_Idle state with a longer cycle time than active mode.

There are two RRC states for a UE: (1) RRC_Idle where the radio is not active, but an identifier (ID) is assigned to the UE and tracked by the network; and (2) RRC_Connected with active radio operation having context in the eNB.

Example Methods and Apparatus for Reducing Collisions Between CDRX and Paging Operations In single radio LTE (SRLTE) devices (e.g., UEs), if the device is connected to an LTE network, the device may perform a full tune away (FTA) from LTE and use RF resources to conduct paging channel monitoring of another RAT (e.g., GSM or 1×RTT). When the device is operating in a CDRX mode and monitoring paging on another RAT, there is a finite probability that the LTE CDRX period will collide with one or more 1× or GSM paging cycles. In a device that supports 1×RTT and LTE, the 1×RTT paging interval can collide (e.g., persistently collide) with an LTE CDRX period.

The probability of the 1×RTT paging cycle and an LTE CDRX period persistently colliding for any single-radio device varies with the parameters of the 1×RTT paging cycle and the LTE CDRX period. For example, the possibility of a persistent collision is 6.25% when the 1×RTT paging cycle is 1.28 sec, the device tunes to 1×RTT for 80 ms during each paging cycle, and the LTE CDRX period is 1.28 sec.

When a CDRX period of a device collides with a paging interval (e.g., a portion of the on duration of the CDRX period occurs during one or more paging intervals of another RAT), the device may monitor for pages of the other RAT and not tune to the LTE cell during the on duration. When the device does not tune to the LTE cell during the on duration, the device will miss a page sent from the LTE cell during that on duration. If the LTE cell has data to deliver to the device, the LTE cell will not page the device again until the device's next on duration. Alternatively, when a CDRX period of a device collides with a paging interval (e.g., a portion of the on duration of the CDRX period occurs during one or more paging intervals of another RAT), the device may monitor the PDCCH and may not monitor for pages of the other RAT during the on duration. When the device does not monitor for pages of the other RAT during the on duration, the device will miss a page sent from the other RAT cell during that on duration. If the other RAT has data to deliver to the device, the other RAT cell will not page the device again until the device's next paging interval for that RAT cell.

If the on duration of CDRX periods for a device consistently collides with paging intervals of another RAT, the device may fail to tune to the device's serving LTE cell for an extended period of time. If the device fails to tune the device's serving LTE cell for too long, the serving cell may drop the data for the device, due to expiry of a connection timer, for example. Data for some applications may be sent again by those applications, while data for other applications may be lost.

In LTE, the start of CDRX may be determined by a parameter named longDRX-CycleStartOffset that is set for each UE by the network via RRC signaling. The longDRX-CycleStartOffset parameter is used (e.g. in a calculation) by the UE to determine in which subframe the UE's on duration should commence. For example, a UE may be configured with a CDRX cycle length of 1280 subframes (e.g., 1280 ms) and a longDRX-CycleStartOffset of 511. In the example, the UE may begin its on duration whenever (SFN*10+subFN) mod 1280=511, where SFN is the system frame number, subFN is the subframe index number, and mod is the modulo operation.

Figure 7:
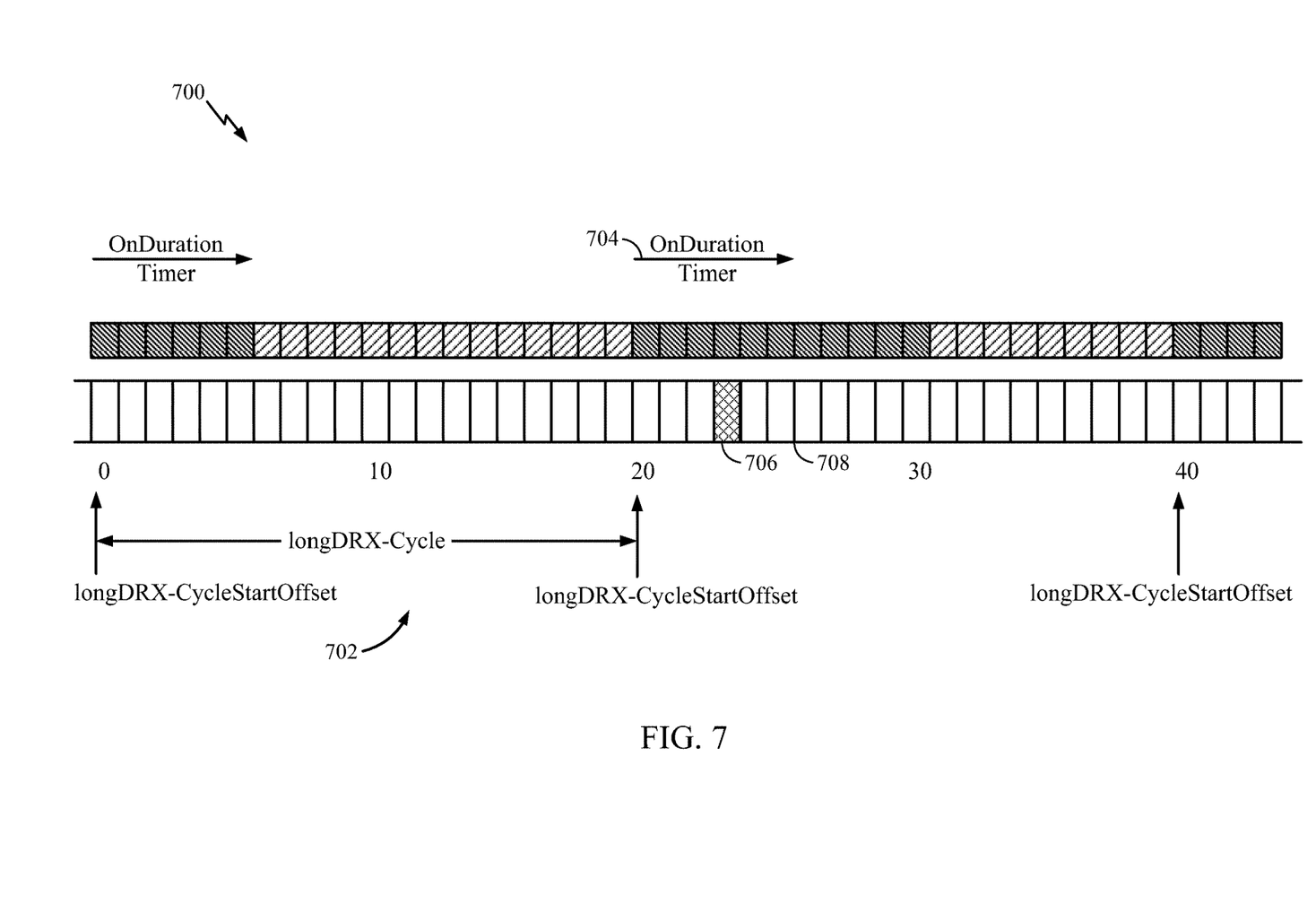
FIG. 7 illustrates connected discontinuous reception (CDRX) and paging operations in accordance with aspects of the present disclosure.

FIG. 7 illustrates an exemplary timeline 700 of a UE performing CDRX on an LTE network and monitoring for pages on another RAT network. The duration of an exemplary CDRX cycle is shown at 702. At 704, the equation (SFN*10+subFN) mod longDRX-Cycle=longDRX-CycleStartOffset is satisfied, and the UE begins an on duration of the CDRX cycle. At 706, the UE determines to monitor another RAT (e.g., 1×RTT, GSM) network for pages. The monitoring for pages on the other RAT collides with (e.g., occurs during) the on duration of the CDRX cycle. If the cycle for monitoring pages on the other RAT is, for example, a whole or fractional multiple of (e.g., equal to) the CDRX cycle length, then the collision may occur during each on duration of the CDRX cycle, causing a persistent collision between the CDRX on durations and the other RAT'S paging cycle.

In the exemplary timeline 700, if the on duration of the CDRX cycle begins at time 708, then the CDRX on duration may not collide with the paging interval of the other RAT. Changing the longDRX-CycleStartOffset parameter for a UE may allow the UE to avoid collisions between CDRX on durations and 1×RTT or GSM paging cycles or slots.

Figure 8:
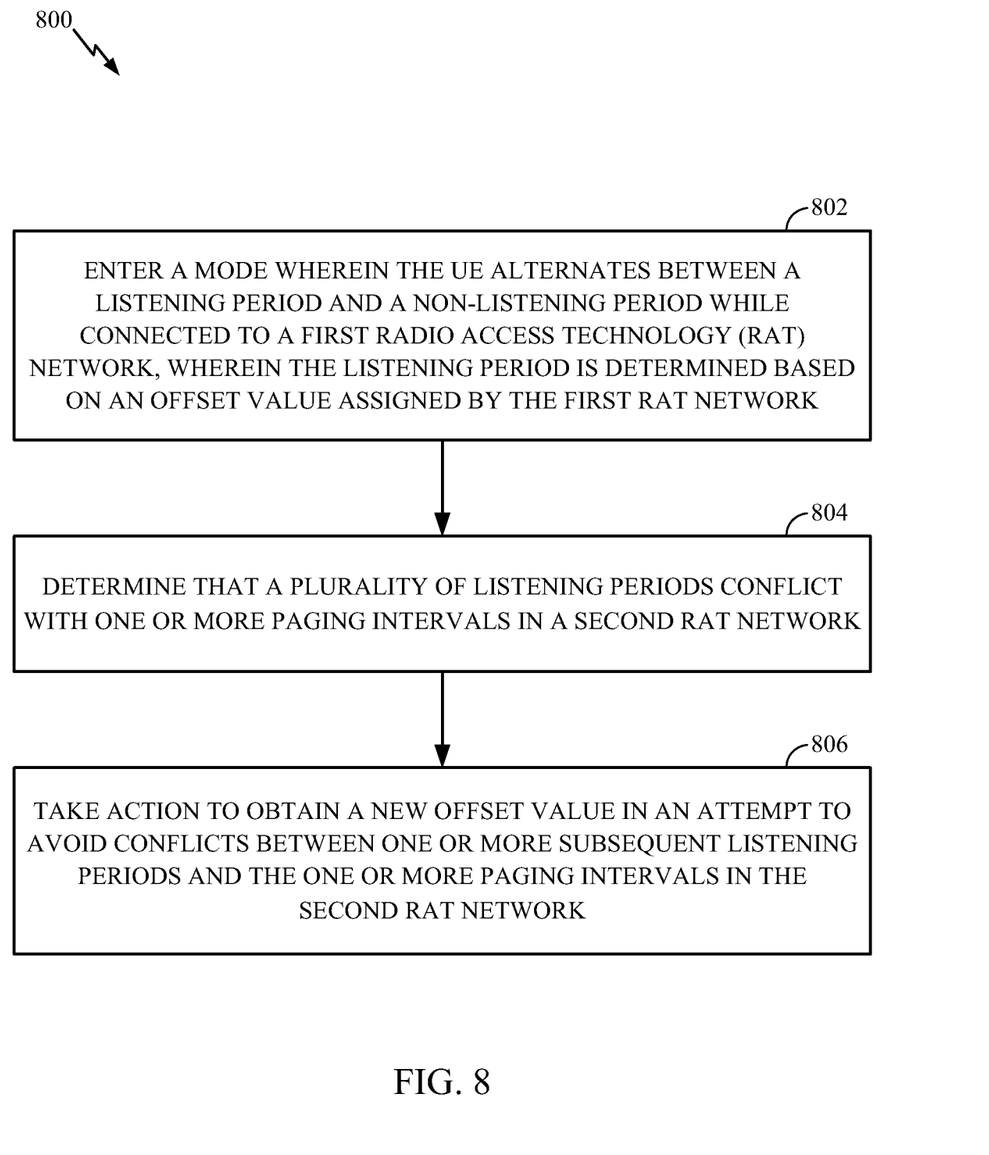
FIG. 8 illustrates an example method for reducing collisions between connected discontinuous reception (CDRX) and paging operations in accordance with aspects of the present disclosure.

FIG. 8 illustrates operations 800 that may be performed for reducing collisions between connected discontinuous reception (CDRX) and paging operations (e.g., to avoid persistent collisions between CDRX on durations and 1×RTT or GSM paging cycles or slots). Operations 800 may be performed by a UE, for example. Operations 800 begin at 802, by the UE, for example, entering a mode wherein the UE alternates between a listening period (e.g., an on duration of a CDRX cycle) and a non-listening period (e.g., an off duration of a CDRX cycle) while connected to a first radio access technology (RAT) network, wherein the listening period is determined based on an offset value assigned by the first RAT network. At 804, the UE, for example, may determine that a plurality of listening periods conflict with one or more paging intervals in a second RAT network. At 806, the UE, for example, may take action to obtain a new offset value in an attempt to avoid conflicts between one or more subsequent listening periods and the one or more paging intervals in the second RAT network. In aspects, one or more subsequent listening periods may include an on duration of a new CDRX cycle based on a different offset value.

According to certain aspects of the present disclosure, taking action to obtain a new offset value may comprise taking action to disconnect from and reconnect to the first RAT network. In aspects, the UE may autonomously take such action.

According to certain aspects of the present disclosure, taking action to disconnect from and reconnect to the first RAT network may comprise declaring a radio link failure (RLF).

According to certain aspects of the present disclosure, taking action to disconnect from and reconnect to the first RAT network may include sending an RRC connection reestablishment request.

According to certain aspects of the present disclosure, a UE or other device may determine that one or more subsequent listening periods conflict with one or more paging intervals in the second RAT network after taking action to obtain the new offset value; and in response, determine not to take action to obtain another new offset value.

According to certain aspects of the present disclosure, taking action to obtain a new offset value may comprise transmitting a request to the first RAT network to assign a new offset value.

According to certain aspects of the present disclosure, the operations 800 may be performed by a single-radio device.

According to certain aspects of the present disclosure, the mode the UE or other device enters may be an RRC connected state discontinuous reception operation mode.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
    entering a mode wherein the UE alternates between listening periods and non-listening periods while connected to a first radio access technology (RAT) network, wherein the listening periods are determined based on an offset value assigned by the first RAT network;
    determining that a plurality of the listening periods each conflict with one or more paging intervals in a second RAT network;
    taking action to obtain a new offset value in an attempt to avoid conflicts between one or more subsequent listening periods and the one or more paging intervals in the second RAT network;
    determining that one or more subsequent listening periods conflict with one or more paging intervals in the second RAT network after taking action to obtain the new offset value; and
    determining not to take action to obtain another new offset value in response to the determination that the one or more subsequent listening periods conflict with the one or more paging intervals in the second RAT network.

2. The method of claim 1, wherein taking action to obtain a new offset value comprises taking action to disconnect from and reconnect to the first RAT network.

3. The method of claim 2, wherein taking action to disconnect from and reconnect to the first RAT network comprises declaring a radio link failure (RLF).

4. The method of claim 2, wherein taking action to disconnect from and reconnect to the first RAT network includes sending a radio resource control (RRC) connection reestablishment request.

5. The method of claim 1, wherein taking action to obtain a new offset value comprises transmitting a request to the first RAT network to assign a new offset value.

6. The method of claim 1, wherein the UE is a single-radio device.

7. The method of claim 1, wherein the mode is a radio resource control (RRC) connected state discontinuous reception operation mode.

8. An apparatus for wireless communications, comprising:
    a processing system configured to:
        enter a mode wherein the apparatus alternates between listening periods and non-listening periods while connected to a first radio access technology (RAT) network, wherein the listening periods are determined based on an offset value assigned by the first RAT network,
        determine that a plurality of the listening periods each conflict with one or more paging intervals in a second RAT network, and
        take action to obtain a new offset value in an attempt to avoid conflicts between one or more subsequent listening periods and the one or more paging intervals in the second RAT network,
        determine that one or more subsequent listening periods conflict with one or more paging intervals in the second RAT network after taking action to obtain the new offset value; and
        determine not to take action to obtain another new offset value in response to the determination that the one or more subsequent listening periods conflict with the one or more paging intervals in the second RAT network; and
    a memory coupled with the processing system.

9. The apparatus of claim 8, wherein the processing system is configured to take action to obtain a new offset value by taking action to disconnect from and reconnect to the first RAT network.

10. The apparatus of claim 9, wherein the processing system is configured to take action to disconnect from and reconnect to the first RAT network by declaring a radio link failure (RLF).

11. The apparatus of claim 9, wherein the processing system is configured to take action to disconnect from and reconnect to the first RAT network by sending a radio resource control (RRC) connection reestablishment request.

12. The apparatus of claim 8, wherein the processing system is configured to take action to obtain a new offset value by causing the apparatus to transmit a request to the first RAT network to assign a new offset value.

13. The apparatus of claim 8, further comprising:
    a single radio.

14. The apparatus of claim 8, wherein the mode is a radio resource control (RRC) connected state discontinuous reception operation mode.

15. An apparatus for wireless communications, comprising:
    means for entering a mode wherein the apparatus alternates between listening periods and non-listening periods while connected to a first radio access technology (RAT) network, wherein the listening period is determined based on an offset value assigned by the first RAT network;
    means for determining that a plurality of the listening periods each conflict with one or more paging intervals in a second RAT network; and
    means for taking action to obtain a new offset value in an attempt to avoid conflicts between one or more subsequent listening periods and the one or more paging intervals in the second RAT network;
    means for determining that one or more subsequent listening periods conflict with one or more paging intervals in the second RAT network after taking action to obtain the new offset value; and
    means for determining not to take action to obtain another new offset value in response to the determination that the one or more subsequent listening periods conflict with the one or more paging intervals in the second RAT network.

16. The apparatus of claim 15, wherein the means for taking action to obtain a new offset value comprises means for taking action to disconnect from and reconnect to the first RAT network.

17. The apparatus of claim 16, wherein the means for taking action to disconnect from and reconnect to the first RAT network comprises means for declaring a radio link failure (RLF).

18. The apparatus of claim 16, wherein the means for taking action to disconnect from and reconnect to the first RAT network comprises means for sending a radio resource control (RRC) connection reestablishment request.

* * * * *